Feb. 4, 1936. A. OBERHOFFKEN ET AL 2,029,335
CONTROL MECHANISM FOR MACHINE TOOLS
Filed April 1, 1933 2 Sheets-Sheet 2
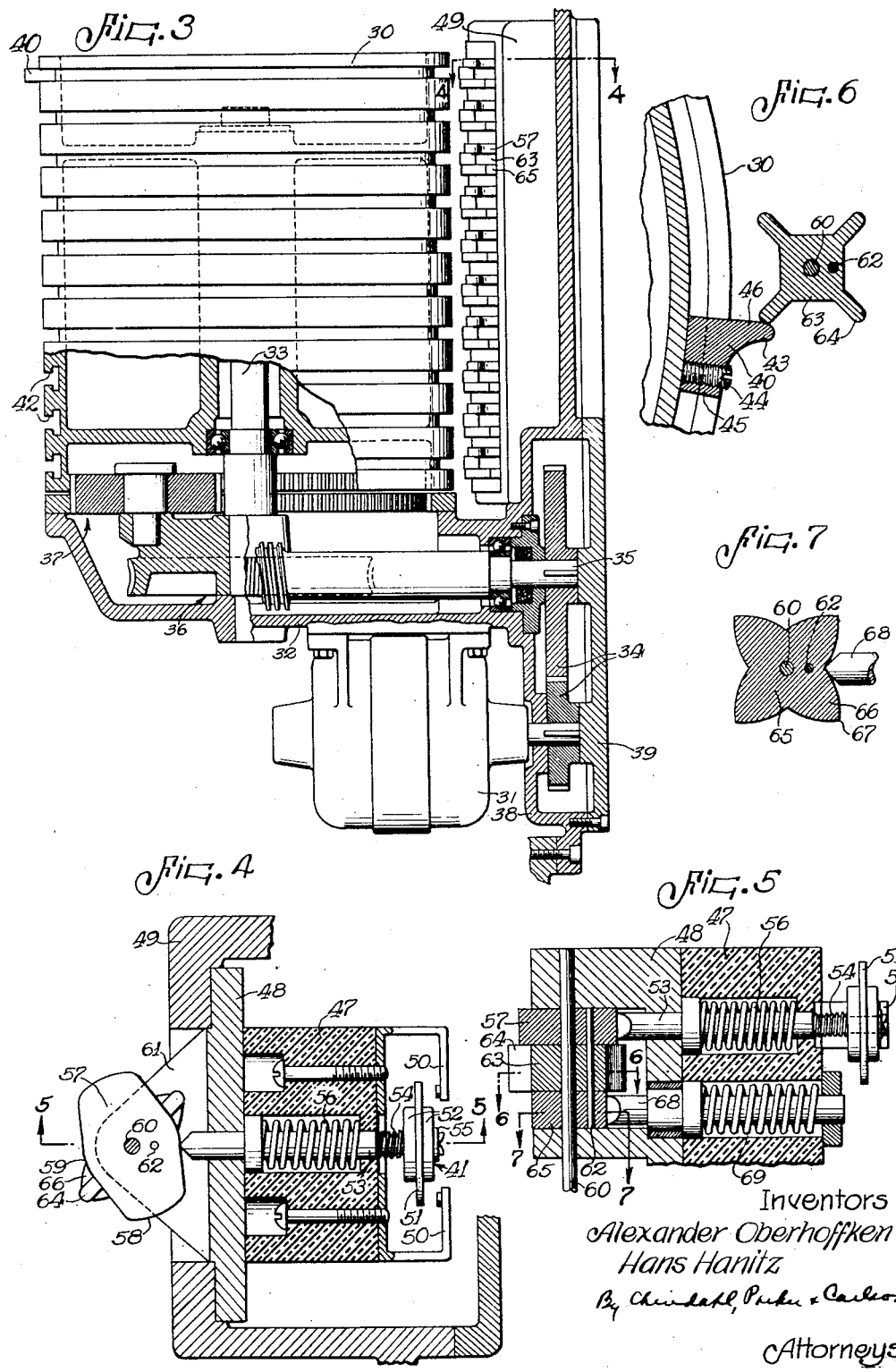
Inventors
Alexander Oberhoffken
Hans Hanitz
By Chindahl, Parker & Carlson
Attorneys Patented Feb. 4, 1936

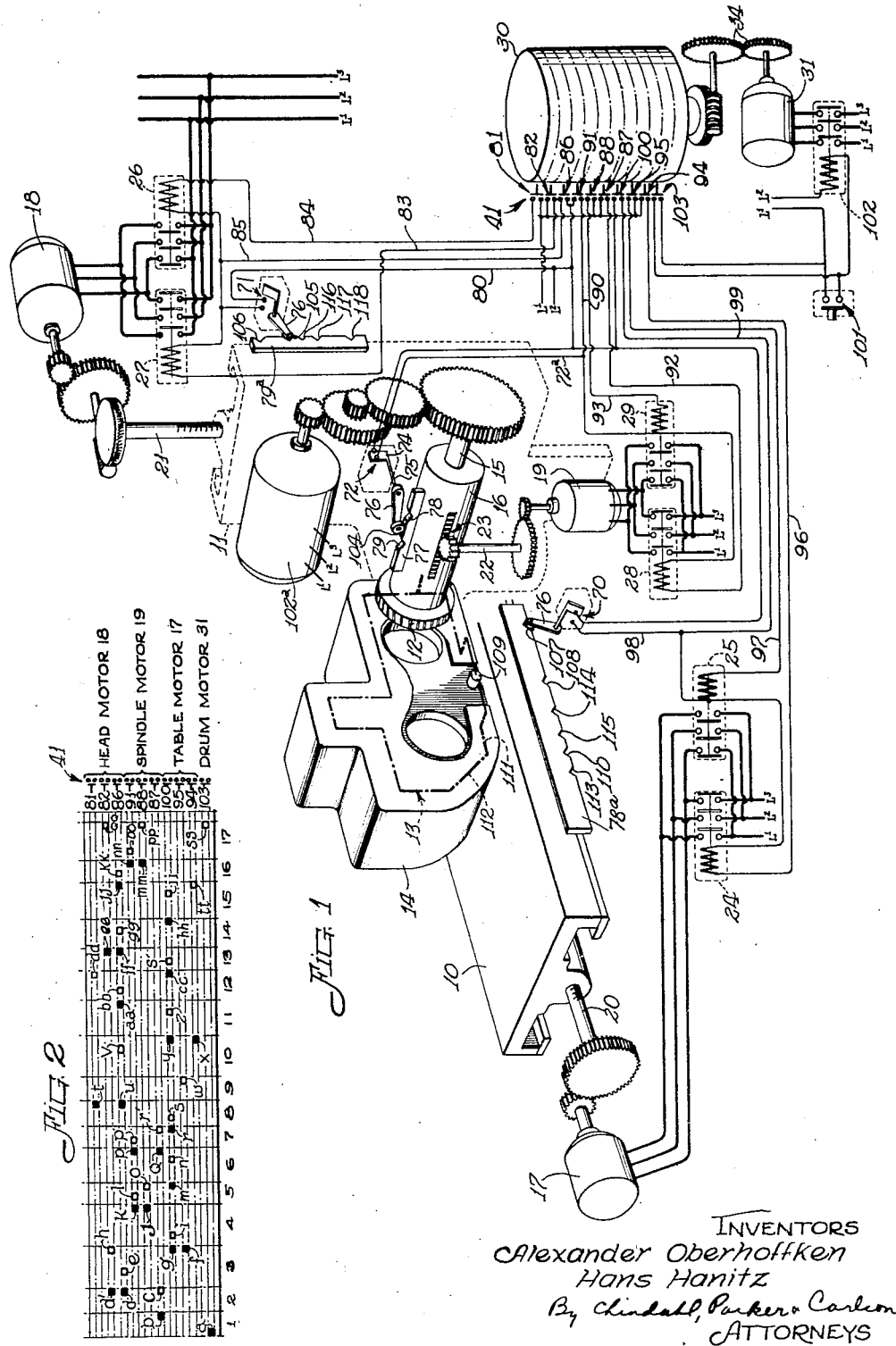

2,029,335

UNITED STATES PATENT OFFICE

2,029,335

CONTROL MECHANISM FOR MACHINE TOOLS

Alexander Oberhoffken and Hans Hanitz, Rockford, Ill., assignors to Ingersoll Milling Machine Company, Rockford, Ill., a corporation of Illinois Application April 1, 1933, Serial No. 663,894

3 Claims. (Cl. 172—239)

This invention relates generally to the automatic control of a machine to define a cycle of operations thereof during which the tool and work supports are moved relative to each other through a series of different movements in a predetermined sequence.

One object of the invention is to provide a novel control mechanism of relatively simple and inexpensive construction adapted to define complicated machine tool cycles involving relative motion between work and tool supports along a plurality of different paths.

Another object is to provide a novel control mechanism especially adapted to define complicated cycles in a machine tool in which relative movements between the tool and work supports are effected by electric driving means.

A more detailed object is to provide a novel control mechanism by which a plurality of electrically driven operators each arranged to effect relative movement between tool and work supports may be controlled in timed sequence and the timing thereof varied to suit operating conditions.

Other objects and advantages of the invention will become apparent from the following detailed description taken in connection with the accompanying drawings, in which Figure 1 is a schematic view of a control system embodying the present invention and applied to a typical machine tool set-up.

Fig. 2 is a diagrammatic view of a part of the cycle controlling mechanism.

Fig. 3 is a plan view partially in section showing the major portion of the main controller.

Fig. 4 is a section taken along the line 4—4 of Fig. 3.

Fig. 5 is a section taken along the line 5—5 of Fig. 4.

Figs. 6 and 7 are views taken respectively along the lines 6—6 and 7—7 of Fig. 5.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

In the exemplary form shown in Fig. 1, the invention is utilized to define a cycle of relative movements between two supports 10 and 11 to cause a tool 12 carried by one of the supports to traverse a fixed path 13 on a work-piece 14 carried by the other support. As shown herein, the tool is a milling cutter fast on a spindle 15 which is journaled in a sleeve 16 mounted for axial movement relative to the support 11 to cross-feed the cutter toward and from the work. The support or head 11 is mounted to slide vertically along suitable ways while the table 10 is slidable along horizontal ways. Thus the tool and work supports are adapted for relative movement along three fixed paths which extend perpendicular to each other.

Independently operable power operators are provided for effecting relative movements between said supports in opposite directions along the respective paths. Preferably, these operators comprise individual reversible electric motors 17, 18 and 19 operating through speed reduction gearing to drive shafts 20, 21 and 22 in opposite directions. The shafts 20 and 21 are screw-threaded into the supports 10 and 11 and produce endwise reciprocation of the supports upon rotation in opposite directions. The shaft 22 actuates the cutter sleeve 16 through a rack and pinion connection 23 or this may be accomplished by a suitable cam movement. Pairs of magnetic switches or relays indicated by numerals 24 and 25, 26 and 27, and 28 and 29, are employed as pilot devices for controlling the starting of and stopping of the motors 17, 18 and 19.

The automatic cycle controlling mechanism contemplated by the present invention includes a common or unitary controller by which different parts of the cycle are initiated in timed sequence and a plurality of independently operable control devices by which the power operators are controlled to terminate the different parts of the cycle independently of said controller. Said controller is moved continuously in one direction throughout the cycle substantially in timed relation to the relative movements between the tool and work supports in different directions along the different paths while said control devices are individually responsive to the relative movements between the tool and work supports along the different paths.

In the present embodiment, the controller above referred to includes a rotary element in the form of a cylindrical drum 30 driven at constant speed and unidirectionally through one revolution for each machine cycle. Power for effecting such drive is preferably supplied by a small constant speed or synchronous motor 31 mounted on a support 32 from which projects a rigid vertical stud 33 on which the drum is rotatably mounted. To drive the drum at a very slow speed, the motor shaft is connected by spur gears 34 to a shaft 35 which in turn drives the drum through the medium of a worm gearing 36 and a planetary gearing 37. The gears 34 are housed within a casing 38 having a cover 39 which may be removed to permit removal and replacement of the gears for the purpose of varying the driving ratio between the motor 31 and the drum 30 and therefore the time required for one machine cycle determined by one revolution of the drum. Since the drum 30 is driven independently of the power operators for the tool and work supports and no mechanical connections with the latter are necessary, the drum may be located in any desired out-of-the-way place such for example within the frame of the machine tool.

Mounted on the periphery of the drum in axially spaced rows are a plurality of dogs referred to generally by the numeral 40, the dogs in each row being arranged to control the opening and closing of one of a group of switches 41 by which the relays for the different power operators are controlled. In the form shown, each dog comprises a metal block of generally T-shaped cross-section seated in a peripheral groove 42 of corresponding shape in the drum 30 and having a projection 43 extending radially outward from the drum. By tightening a screw 44 threading through the trailing portion 45 of the block, the dog may be clamped to the drum with its radially extending leading surface 46 in any desired circumferential position.

The switches 41 are arranged in closely spaced relation along a bar 47 of insulation carried by a metal bar 48 which is removably secured within a casing 49 integral with the housing 38. Herein each switch comprises a pair of contacts 50 rigid with the bar 47 and a movable contact member 51 mounted between disks 52 of insulation on a rod 53 and normally urged by a spring 54 against a flange 55 on the rod. The latter is slidable endwise through the bars 47 and 48 and normally urged by a compression spring 56 into switch-opening position.

To provide for opening and closing of the switches with a snap action and the retention of the switch in open or closed position independently of the dogs 40, the rod 53 is actuated by a cam 57 which is advanced with a step-by-step motion as successive dogs 40 in one of the rows on the drum pass a predetermined point. In successive steps of the cams, lobes 58 and depressions 59 thereon engage the end of the rod 53 and cause movement of the latter between switch-closing and switch-opening positions. The cam is loose on a removable pin 60 supported at opposite ends in lugs 61. Loose on the pin 60 but secured to the cam 58 as by a removable pin 62 is a wheel 63 having teeth 64 spaced to correspond to the lobes and depressions of the cam 57 as shown in Fig. 4 and adapted to be engaged successively by the surfaces 46 of the dogs 40 in one row. Also mounted for rotation with the cam 57 is a disk 65 having teeth 66 which converge outwardly to points 67 and bear against one end of a plunger 68 slidable in the bars 47 and 48 and urged toward the teeth by a compression spring 69. As the wheel 63 is advanced by a dog 40, the leading surface of one of the teeth 66 cams the plunger 68 against the action of the spring 69 until the plunger passes over-center with respect to a point 67 whereupon the energy stored in the spring 69 is released and the plunger, acting as a cam on the trailing surface of the tooth 66, advances the wheels 63 and 65 and the cam 57 rapidly and ahead of the dog 40 until the plunger becomes seated in one of the notches between the teeth 66. The switch is thus opened or closed with a snap action and the rest positions of the cam 57 are accurately defined by the wheel 65.

The independently operable control devices above referred to for terminating the different parts of the machine cycle to determine the extent of relative movement between the tool and work supports in each of said parts comprise switches 70, 71 and 72 interposed in common conductors controlling the sets of relays for the respective motors 17, 18 and 19. The switch 72 comprises two stationary contacts 73 and a movable contact arm 74 pivoted at 75 on the tool support 11 and having an arm 76 engaged by a cam bar 77 secured to the cutter sleeve 16. The bar maintains the switch closed except when the arm 76 is disposed in one of a plurality of notches 78 and 79 when the switch is allowed to open. The switches 70 and 71 are similarly constructed and mounted on stationary parts of the machine for actuation by notched cam bars 78ª and 79ª secured to the tool and work supports respectively.

Referring now to Fig. 1, the switch 71 is interposed in a conductor 80 leading from the power conductor L² to electrically common terminals of the coils of relays 26 and 27, the other terminals of which are connected by conductors 83 and 84 to the switches 82 and 81 respectively, which have a common terminal leading to the power conductor L¹. To permit the relays 26 and 27 to be energized independently of the switch 71, a conductor 85 is shunted around the switch 71 and includes a switch 86 arranged to be actuated by the dogs of one row on the drum 30. When the latter switch is closed, either of the relays 26 and 27 may be energized by closure of the proper one of the switches 81 and 82. It will be apparent that when the switch 71 is open, either of the relays 26 and 27 can be energized by closure of the shunt switch 86 and the proper one of the switches 81 and 82 and that after the motor 18 has started and the switch 71 closed, the control of the motor may be transferred to the switch 71 simply by opening the shunt switch. Then termination of operation of the motor 18 while rotating in either direction will occur upon opening of the switch 71.

In a similar way, the common contacts of switches 87 and 88 are connected to the power conductor L¹ and the insulated terminals of these switches are connected to the coils of the relays 28 and 29 by conductors 92 and 93. The common terminal of these coils extends to the power connection L² through a conductor 72ª having a switch 72 interposed therein and through a shunt conductor 90 including a dog actuated switch 91. The coils of the relays 24 and 25 are joined to the insulated contacts of the switches 94 and 95 by conductors 96 and 97 and the common terminal of these coils leads to the power line L² through a conductor 98 including the switch 70 or through a conductor 99 including a switch 100 actuated by the dogs in another of the rows. The common terminal of the switches 94 and 95 is connected to the power line L¹. Starting of the drum drive motor 31 to initiate a machine cycle may be initiated by closure of a manually operable switch 101 energizing the coil of a relay 102 governing the motor. The relay may be maintained energized during the cycle by closure of a dog-actuated switch 103. If desired, the motor 102ᵃ for rotating the cutter 12 through suitable speed reduction gearing may be started and stopped by energization and deenergization of the relay 102.

Operation

The operation of the control mechanism will now be described with reference to the execution of a cycle for causing the cutter 12 to traverse the irregular path 13 (Fig. 1). For convenience, reference will be made to Fig. 2 which shows a development of the control drum surface with the different parts of the cycle indicated by numbers and the dogs 40 by letters, the dogs which effect closing of a switch being represented by the solid block squares while the other dogs cause switches to be opened. Let it be assumed that the dogs which control the closure of the different switches 41 have been positioned around the drum as shown in Fig. 2 so as to become active in causing rapid movements of the corresponding cams 57 at points in the drum revolution represented by the vertical lines. The speed of the drum 30 is adjusted by selection of the proper pick-off gears 34, so that the drum makes one revolution in a time interval somewhat greater than the sum of the time intervals required for execution of all of the different relative movements between the tool and work supports. In other words, the speed of the drum is so adjusted as to allow ample time for completion of each relative movement between the tool and work supports before the next relative movement is initiated under the control of the drum.

In the starting position of the drum, the switches 70 and 71 and all of the switches 41 with the exception of the switch 72 are open. The work-piece 14 is properly positioned on the table 10 with the cutter 12 backed away from the work-piece slightly so that the arm 76 of the switch 72 is in engagement with a surface 104 of the bar 77, the switch being thereby held closed. To start the cycle, the operator closes the switch 101 thereby starting the motor 31 and the cutter drive motor 102ᵃ. In the initial movement of the drum, a dog a causes the cam 57 of the switch 103 to be advanced closing the latter switch and placing the cycle completely within the control of the drum 30. Shortly thereafter, a dog b becomes effective to close the switch 87 and complete a circuit for energization of the relay 28 whereupon the motor 19 is started to feed the cutter 12 toward the work. This circuit extends from the power line L¹ through the switch 87, the conductor 92, the coil of relay 28, the conductor 72ᵃ, the closed switch 72 to the power line L². When the cutter has entered the work-piece to the proper depth, the arm 76 of the switch 72 drops into the notch 78 thereby allowing the switch to open which stops the motor 19 and terminates the inward feed of the cutter.

To allow for variations in the time required for the cutter to be advanced to the proper depth, initiation of the next part of the cycle is delayed by location of the dog d so that it does not close the switch 86 until ample time has been allowed for completion of the inward movement of the cutter. Closure of the switch 86 completes the shunt around the then open switch 71 connecting the conductor L² and the coil of the relay 27. Simultaneously the switch 82 is closed by a dog d¹ completing the circuit of the power line L¹ through the conductor 83 and starting the motor 18 in a direction to feed the head 11 downwardly. At this time, a dog c may open the switch 87.

In the initial downward movement of the head 11, the arm 76 of the switch 71 rides out of a notch 105 closing the switch 71 which is in parallel with the switch 86. Shortly thereafter, a dog e operates to open the switch 86, the energization of the relay 27 being continued under the joint control of the switches 71 and 82. Thus, the control of the motor 18 is transferred to the switch 71. When the cutter has reached the bottom edge of the work-piece, the arm 76 of the switch 71 drops into a notch 106 allowing the switch to open which interrupts the operation of the motor 18 and the down feed of the head 11. Next, two dogs f and g become effective to close the switches 95 and 100 and establish a shunt circuit around the switch 70 for energizing the coil of the relay 25, the circuit extending from L¹ through the conductor 97, the relay coil conductor 99, and the switch 100 to L². This starts the motor 17 to feed the table 10 to the right. The then closed switch 82 may be opened by a dog h. After the arm 76 of the switch 70 has risen out of the notch 107, the switch 100 is opened by a dog i and the control of the motor 17 transferred to the switch 70 which is in parallel with the switch 100 so that the horizontal feed of the table will be interrupted when the notch 108 is encountered and the switch 70 opened. This occurs as the cutter approaches the boss 109 on the work-piece.

To retract the cutter for machining the end of the boss 109, dogs j and k operate to close the switches 88 and 91 which closes a circuit from L¹ through the switch 88, the conductor 93, the coil of relay 29, the conductor 90, the switch 91 to L². This starts the motor 19 to move the cutter outwardly. After the arm of the switch 72 has risen out of the notch 78, a dog l becomes effective to open the switch 91. Then as the arm encounters the notch 79, the outward feed of the spindle will be interrupted. A dog m then closes the switch 100 which cooperates with the then closed switch 95 to again complete the energizing circuit for the coil of the relay 25, starting the motor 17 to initiate movement of the table 10 to the right for the purpose of machining the end of the stud 109. A dog o may operate at this time to open the then closed switch 88. The arm of the switch 70 rises out of the notch 108 but the shunt switch 100 is maintained closed as the arm passes over the notches 114 and 115 after which a dog n opens the switch 100. This feed of the table continues until the cutter has passed the boss whereupon the notch 110 allows the switch 70 to be opened. Thereafter, dogs p and q operate to close the switches 91 and 87 which causes the relay 28 to again be energized and the motor 19 to be started for feeding the cutter inwardly. The switch 72 closes as its arm rises out of the notch 79 after which a dog p¹ opens the switch 91. When the cutter reaches the proper depth, the arm of the switch 72 drops into the notch 78 thereby interrupting the cutter feed at a depth flush with the surface previously machined on the other side of the boss 109.

The eighth part of the cycle during which the table 10 is fed to the right is initiated by closure of the switch 100 in response to a dog r, the switch 95 being closed at this time so that the coil of the relay 25 will again be energized. The switch 87 may be opened at this time by a dog r¹. After the switch 70 has been closed in the advance of the table by the motor 17, a dog s opens the switch 100, transferring the control of the motor 17 to the switch 70. When the cutter axis has traversed the distance 111, dogs t and u operate to close the switches 81 and 86. Closure of the switch 86 establishes a shunt circuit extending from the line L² through the switch 86, the conductor 85, the coil of the relay 26, the conductor 84, and the switch 81 to L¹. This starts the motor 18 in a direction to raise the head 11 and this motion combined with the continued horizontal movement of the table 10 to the right, produces a resultant movement of the cutter along an upwardly inclined path 112, the arm of the switch 71 moving out of the notch 106. The inclined movement is interrupted when the arm of the switch 70 encounters a notch 113 in the bar 78ª. Then the dog w operates to open the switch 95. The upward movement of the head 11 continues, the shunt switch 86 remaining closed as the notches 105 and 116 in the bar 79ª pass the arm of the switch 71 after which the switch 86 is opened by a dog v.

When the notch 117 is encountered, the switch 71 is allowed to open terminating the upward movement of the head 11. Thereafter, the switches 94 and 100 are closed by dogs x and y to complete a circuit for the coil of the relay 24, which circuit extends from L¹ through the switch 94, the conductor 96, the relay coil 24, the conductor 99, and the switch 100 to L². This initiates operation of the motor 17 in a direction to move the table 10 to the left. A dog z opens the switch 100 after the notch 110 has passed the arm of the switch 70. After the notch 115 has been encountered and the horizontal feed of the table 10 interrupted, a dog aa closes the switch 86 again energizing the coils of the relay 26 through the then closed switch 81. The head thus rises and during this movement a dog bb opens the switch 86. Upward movement is interrupted as the notch 118 is encountered allowing the switch 71 to open.

Movement of the table to the left is next initiated by a dog cc which closes the switch 100, completing the energizing circuit for the coil of the relay 24 through the then closed switch 94. In the ensuing movement, a dog dd opens the switch 81 and a dog s¹ opens the switch 100. Operation of the motor 17 is interrupted by opening of the switch 70 as the notch 114 is encountered. Then dogs ee and ff close switches 82 and 86 energizing the relay 27 and causing the motor 18 to be started in a direction to move the head 11 downwardly, the switch 86 remaining closed as the notch 117 passes the arm of the switch 71. Thereafter, a dog gg opens the switch 86 so that when the notch 116 is encountered, opening of the switch 71 will arrest the downward movement of the head 11. Then a dog hh closes the switch 100 completing a circuit for the relay 24 through the then closed switch 94. The table 10 then moves to the left, the switch 100 remaining closed as the notch 108 is presented to the arm of the switch 70, a dog ii thereafter acting to open the switch 100. As the notch 107 is encountered, the table is stopped by opening of the switch 70. Downward movement of the head to starting position is initiated by a dog jj which closes the switch 86 causing the relay 27 to be energized and the motor 18 to be started. During the ensuing movement, a dog tt opens the switch 94 and a dog kk opens the switch 86 so that the movement may be terminated by opening of the switch 71 as the notch 105 is encountered by the arm of the switch.

The final movement of the cycle consists in retracting the cutter which is initiated by the closure of switches 88 and 91 by dogs mm and nn which energizes the coil of the relay 29 starting the motor 19. A dog oo opens the switch 91 after the switch 72 has been closed as the cutter is withdrawn. The cycle is finally terminated and the drum 30 stopped as dogs pp and ss and qq open the switches 88, 103 and 82.

From the foregoing, it will be apparent that the present control mechanism is adapted to define, without the use of patterns or other outlines of the design to be machined, any profiling cycle which can be accomplished by relative straight line motions between tool and work supports. The mechanism is especially adapted for complicated cycles requiring relative movements of the supports in several different planes. Since all of the different parts of the cycle are initiated by the common drum controller which is driven by an independent source of power, the bulk of the control apparatus can be located in an accessible yet out-of-the-way place and only the relatively simple control switches for terminating the different parts of the cycle need be associated directly with the tool and work supports. The amount of equipment required to define complicated cycles is thus reduced to a minimum. Moreover, the number and complexity of the parts required to change the character of the cycle defined has also been reduced to a minimum in the present control mechanism.

We claim as our invention:

1. In a control mechanism for machine tools having a plurality of relatively movable supports, mechanism for causing a predetermined cycle of relative movements between said supports including an electric motor for driving one of said supports during one part of said cycle, a control element moved unidirectionally and at constant speed throughout said cycle, a switch responsive to relative movement between said supports and arranged to be open at the beginning of said part, to be closed in the initial relative movement between said supports, and to be opened after a predetermined movement thereof, a switch actuated by said control element to cause energization of said motor independently of said first mentioned switch and opened by the control element prior to the opening of the latter switch, and a second switch cooperating with said first mentioned switch to maintain energization of said motor, said last mentioned switch being closed by said element prior to the opening of said second mentioned switch.

2. In combination with a machine tool having tool and work supports arranged for relative movements along a plurality of different paths, a plurality of electric motor driven operators each arranged to drive said supports relative to each other back and forth in opposite directions along one of said paths, a rotary control element, an independent electric motor for driving the latter substantially at constant speed, a group of switches respectively controlling said operators to initiate relative movement between the supports along said paths, a plurality of control switches by which the operation of the different operators may be interrupted, means responsive to relative movements between said supports along the different paths and arranged to actuate said last mentioned switches selectively and to terminate the different movements initiated by said first mentioned switches, and independently operable switch actuators carried by said control element and respectively arranged to operate the individual switches of said group in predetermined sequence, said actuators being mounted on said element for adjustment relative to the element and relative to each other whereby to permit the switches to be actuated singly or in combination and the sequence of operation thereof to be varied.

3. In combination with a machine tool having tool and work supports arranged for relative movements along a plurality of different paths, a plurality of electric motor driven operators each arranged to drive said supports relative to each other back and forth in opposite directions along one of said paths, a rotary control drum, an independent electric timing motor for driving said drum, a group of switches controlling the respective operators to initiate operations of the individual motors thereof, a plurality of control switches by which the operation of the different operators may be interrupted, means responsive to relative movements between said supports along the different paths and arranged to actuate said last mentioned switches selectively and terminate the different movements initiated by said first mentioned switches, and a plurality of dogs arranged on said drum in axially spaced relation for operative association with the respective switches of said group, said dogs being arranged for individual adjustment circumferentially of the drum.

ALEXANDER OBERHOFFKEN.
HANS HANITZ.